United States Patent [19]

Feild

[11] Patent Number: 4,895,342
[45] Date of Patent: Jan. 23, 1990

[54] RADIAL FLOW VALVE ASSEMBLY

[75] Inventor: Eugene P. Feild, Webb City, Mo.

[73] Assignee: Laminar Fluid Controls, Inc., Fort Wayne, Ind.

[21] Appl. No.: 209,421

[22] Filed: Jun. 20, 1988

[51] Int. Cl.$^4$ .............................................. F16K 47/04
[52] U.S. Cl. .................................... 251/120; 251/118; 251/205; 137/510
[58] Field of Search ....................... 251/205, 118, 120; 137/510

[56] References Cited

U.S. PATENT DOCUMENTS

| | | | |
|---|---|---|---|
| 477,192 | 6/1892 | C. L. Bastian | 251/265 |
| 1,196,142 | 8/1916 | Schroeder | 137/224 |
| 1,330,458 | 2/1920 | Young | 417/311 |
| 1,603,514 | 10/1926 | Carter | 137/494 |
| 1,714,802 | 5/1929 | Mueller | 251/118 X |
| 1,972,748 | 9/1934 | Smith et al. | 251/333 |
| 2,372,631 | 3/1945 | Stevenson et al. | 137/494 |
| 2,932,316 | 4/1960 | Stanton | 137/508 |
| 2,938,540 | 5/1960 | Schatzman et al. | 137/508 |
| 2,963,040 | 12/1960 | Zimmer | 137/505.11 |
| 3,211,174 | 10/1965 | Weise et al. | 137/469 |
| 3,317,252 | 5/1967 | Gassman | 303/54 |
| 3,360,952 | 1/1968 | Lewis | 62/196.2 |
| 3,545,485 | 12/1970 | Clark | 137/508 |
| 3,848,632 | 11/1974 | Powell | 137/514 |
| 3,856,043 | 12/1974 | Feild et al. | 137/508 |
| 3,975,116 | 8/1976 | Feild et al. | 417/311 |
| 4,326,554 | 4/1982 | Gongwer | 251/120 X |
| 4,768,558 | 9/1988 | Weber | 251/205 X |

FOREIGN PATENT DOCUMENTS

| | | |
|---|---|---|
| 1,012,791 | 7/1957 | West Germany . |
| 121,570 | 7/1919 | United Kingdom . |
| 1,245,197 | 9/1960 | France . |
| 967,408 | 11/1950 | France . |
| 351,798 | 07/1905 | France . |

Primary Examiner—John Rivell
Attorney, Agent, or Firm—Marger & Johnson, Inc.

[57] ABSTRACT

The disclosed valve may be configured for use as a pressure relief valve, pressure regulator valve or pressure reducing valve. A pair of opposed valve members defines a radial flow path therebetween which extends from the outer radial peripheries of each valve member to an axial bore formed in one of the valve members. The other valve member comprises a substantially pressure balanced piston, the axial movements of which control flow through the valve. A pilot valve for relieving pressure above the piston has its inlet positioned within a cavity formed on the upper surface of the piston. In a second disclosed valve, a pair of opposed valve members defines a radial flow path therebetween which extends from the outer radial peripheries of each valve member to an axial bore formed in one of the valve members. The other valve member is mounted on a stem having an upper end which is urged upwardly by a spring disposed around the stem. A substantially cylindrical element is threadably engaged in the upper end of a valve body in which the valve members are received and the stem is urged thereagainst. In another embodiment, the stem is fixedly connected to the cylindrical element. Rotational movement of the cylindrical element axially moves the stem thereby controlling flow through the valve.

11 Claims, 10 Drawing Sheets

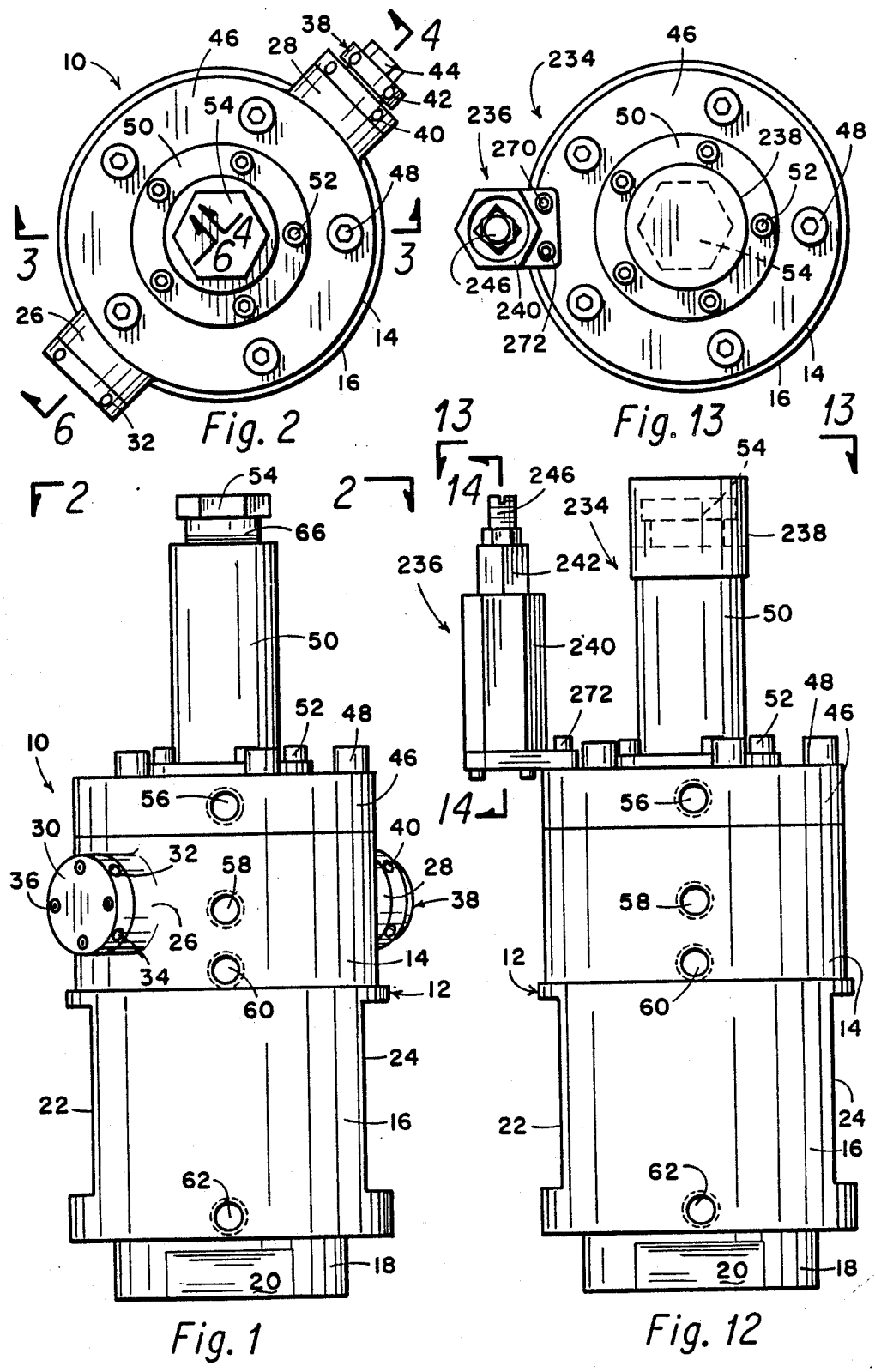

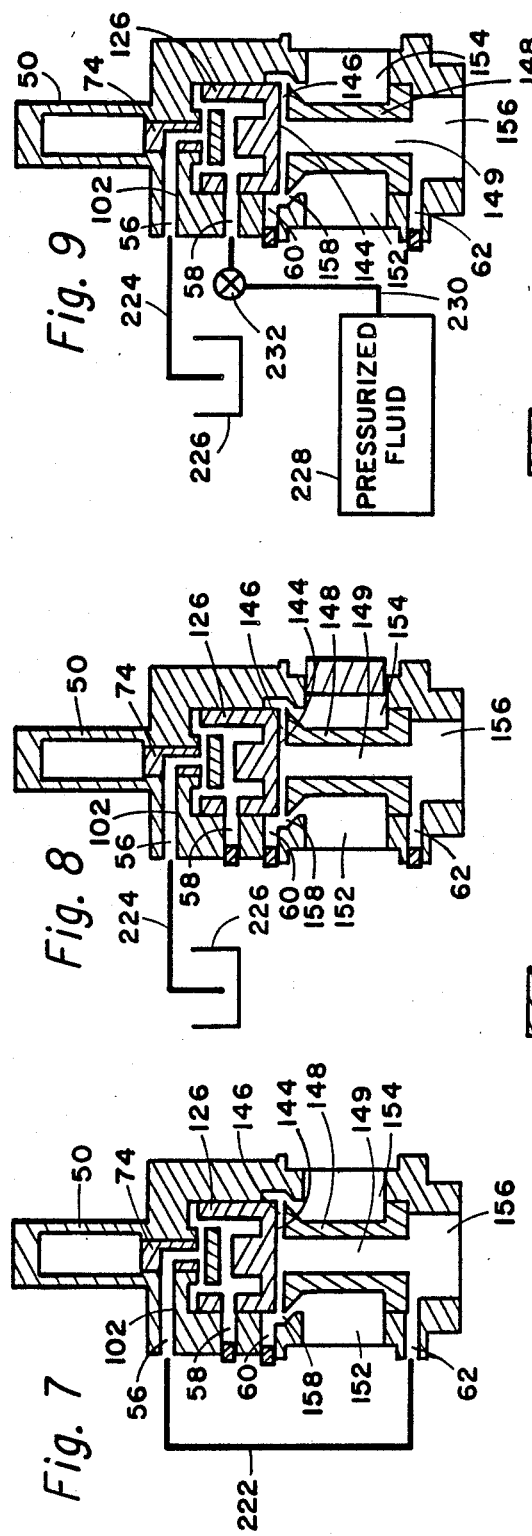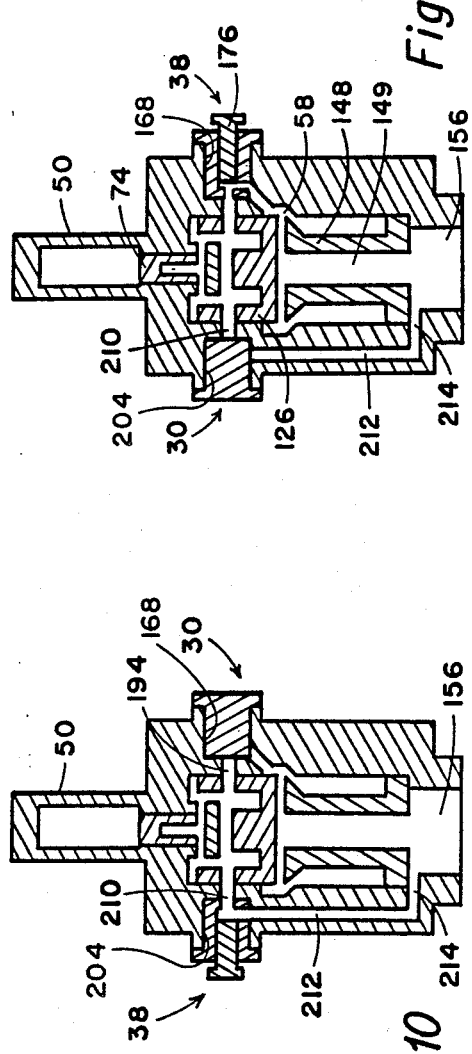

RADIAL FLOW VALVE ASSEMBLY

BACKGROUND OF THE INVENTION

1. Field of the Invention

The instant invention relates to flow control valves and more particularly to such valves in which fluid flows radially inwardly between a pair of seat surfaces and into an orifice communicating with one of the seat surfaces.

2. Description of the Related Art

Valves in which fluid flows radially inwardly between a pair of opposing circular seat surfaces are known in the art. For example, U.S. Pat. No. 3,856,043 to Feild et al. discloses a pressure responsive fluid valve assembly in which such flow occurs. In Feild et al., the opposing valve seats are mounted on a pair of opposing valve members, the first of which is fixed relative to valve body and the second of which is spring-biased toward the first. Fluid is provided to the outer peripheries of the working faces and flows radially inwardly therebetween and into a bore formed in the second valve member and communicating with the second valve member working face.

The valve assembly of Feild et al. accurately regulates pressure over a wide range of relatively low flow rates. However, at higher flow rates, side thrust on the movable (second) valve member, as noted in the patent, prevents accurate regulation.

Also noted in the patent, the pressure distribution between the working faces decreases on an exponential basis from the radially outer peripheries of the working faces toward the orifice which is centered on the second valve member. This aspect of the disclosed Field et al. valve assembly is not necessarily disadvantageous in connection with the structure and operation of the device shown in the patent; however, it has been found to be very disadvantageous in valves which utilize opposed working faces wherein one of the working faces is mounted on a pressure-balanced piston, for example, in a pressure regulating, pressure relief or pressure reducing valve. When the working faces in such valves operate substantially apart from one another, such a pressure-balanced valve does not experience problems; however, as the working faces approach one another, the pressure between the faces drops thus causing the valve to slam shut rather than continuing its pressure regulation, relief or reducing function.

SUMMARY OF THE INVENTION

In one aspect, the invention comprises a housing have a pair of valve members received therein which include opposed working faces. Inlet means permits fluid flow to a location adjacent the outer peripheries of the working faces. Restriction means disposed between the inlet means and the outer peripheries of the working faces restricts and substantially uniformly distributes the flow of fluid about the outer peripheries of the working faces.

In another aspect of the invention, a taper formed on one of said working faces is of a size sufficient to substantially eliminate all pressure decrease between said working faces as said valve members approach one another when fluid is flowing therethrough.

It is an object of the instant invention to provide an improved radial flow valve assembly which overcomes the above-enumerated disadvantages of the prior art.

It is another object of the instant invention to provide such a valve assembly which is capable of accurately controlling flow and pressure over a wide range and at extremely high flows and pressures.

It is still another object of the invention to provide such a valve assembly which is resistant to wear and which produces relatively little noise at high flows and pressures.

BRIEF DESCRIPTION OF THE DRAWINGS

FIG. 1 is side elevational view of a first valve constructed in accordance with the instant invention.

FIG. 2 is a view taken along line 2—2 in FIG. 1.

FIG. 7 is a schematic cross-sectional view similar to that of FIG. 3 showing a first configuration of the valve.

FIG. 8 is a schematic cross-sectional view similar to that of FIG. 3 showing a second configuration of the valve.

FIG. 9 is a schematic cross-sectional view similar to that of FIG. 3 showing a third configuration of the valve.

FIG. 10 is a schematic cross-sectional view of the valve similar to that of FIGS. 4, 5, and 6, but with the plug and valve cartridge positons switched.

FIG. 11 is a schematic cross-sectional view of the valve in the same configuration as shown in FIGS. 4–6.

FIG. 12 is a side elevational view of a second valve constructed in accordance with the instant invention.

FIG. 13 is a view taken along line 13—13 in FIG. 12.

DETAILED DESCRIPTION OF THE PREFERRED EMBODIMENTS

Figure 3:
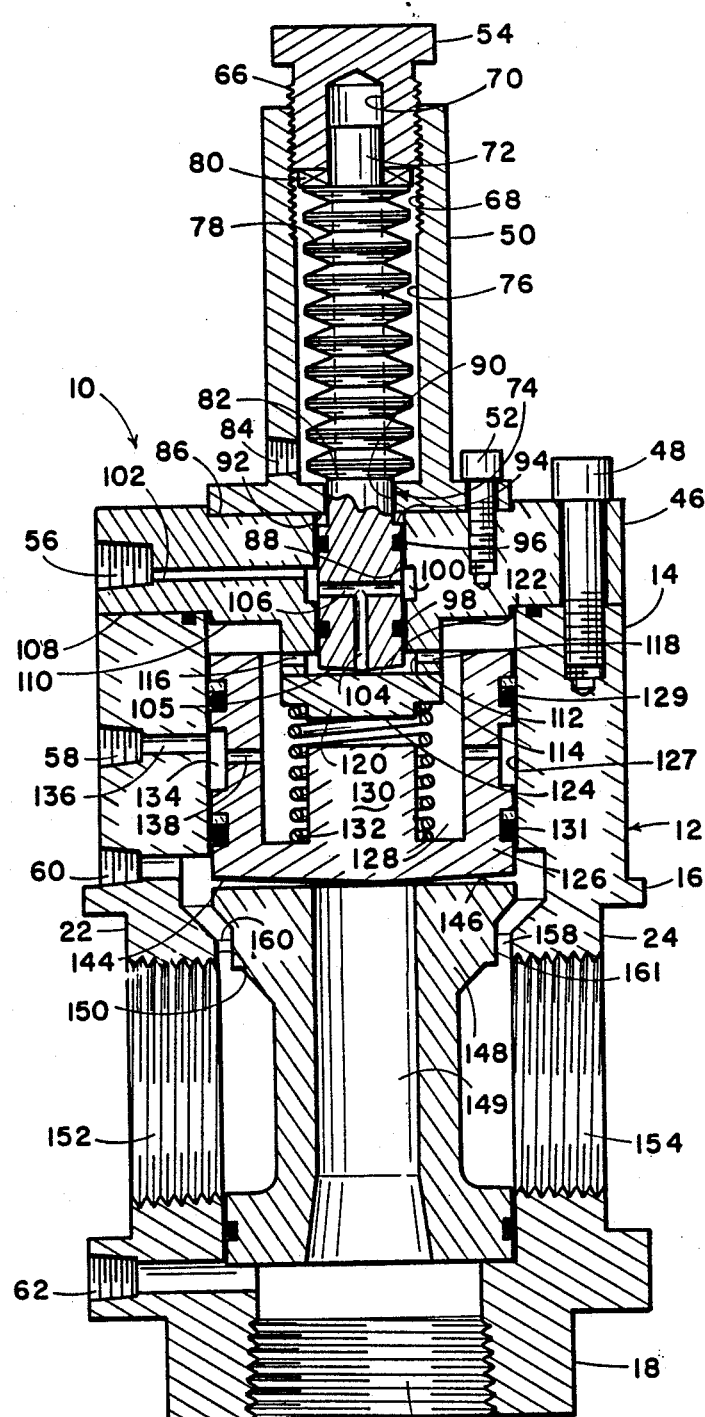
FIG. 3 is a view taken along line 3—3 in FIG. 2.

Turning now to FIGS. 1 and 2, indicated generally at 10 is a valve constructed in accordance with the instant invention. Valve 10 includes a housing or body 12 made up of an upper portion 14, a middle portion 16 and lower portion 18. Each of the body portions are substantially cylindrical in shape. However, lower portion 18 includes an opposed pair of flat surfaces, one of which is surface 20, machined thereon to enable threadably engaging valve 10 with other components as will later be more fully explained. Similarly, middle portion 16 includes an opposed pair of flat surfaces 22, 24 formed thereon for the same purpose. Middle portion 14 includes a pair of opposed cartridge mounting stubs 26, 28 formed integrally with the middle portion.

Figure 6:
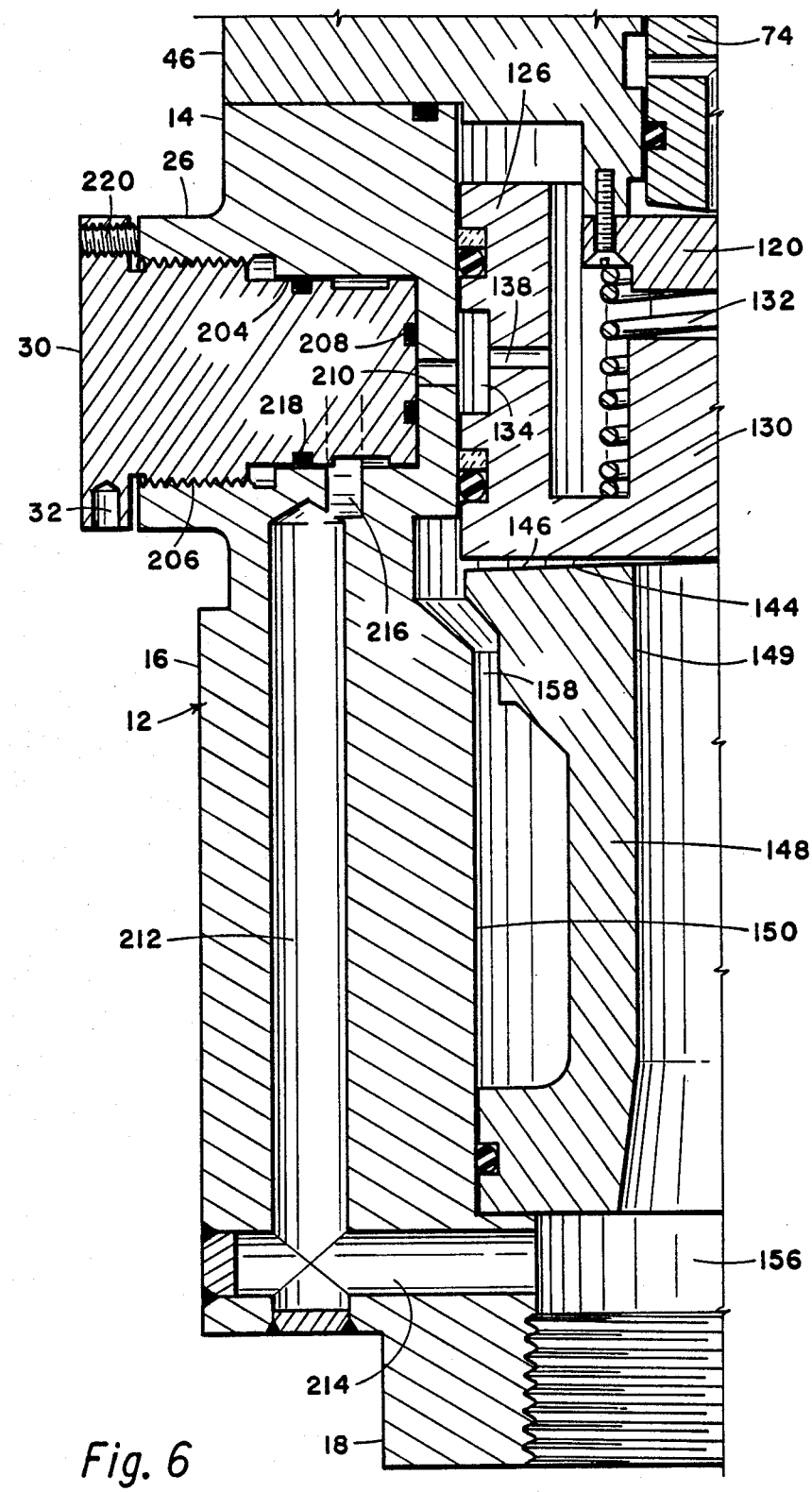
FIG. 6 is a view taken along line 6–6 in FIG. 2.

Mounted on stub 26 is a plug 30, such including a plurality of radial bores, two of which are bores 32, 34, formed thereon to facilitate threading and unthreading plug 30 in stub 26. Plug 30 further includes a plurality of locking screws, one of which is screw 36, received therethrough. Each of the locking screws abuts against the radially outer surface (not visible in FIG. 1) of stub 26 thereby preventing rotational movement of plug 30. A cross-sectional view of plug 30 and stub 26 is shown in FIG. 6 and is described in more detail hereinafter.

A cartridge valve assembly 38 is mounted on stub 28. The cartridge valve assembly is also referred to herein as means for variably restricting flow. Radial bores, two of which are bores 40, 42, are formed on structure associated with cartridge valve assembly 38 to enable threadably engaging and disengaging the same. Also forming a part of the cartridge valve assembly is a lock nut 44 which is also referred to herein as fixing means. Cartridge valve assembly 38, stub 28 and related structure are shown in cross-section in two different configurations in FIGS. 4 and 5 and will be described more fully hereinafter.

A plate 46, such being also referred to herein as a housing, is bolted to upper portion 14 of the valve body via five bolts, one of which is bolt 48, disposed about the center of plate 46 as shown. A substantially cylindrical spring shell 50, such being also referred to herein as containing means and as a tubular element, is mounted on top plate 46 via five bolts, one of which is bolt 52, which are disposed concentrically around the center of the spring shell. Mounted on the top of spring shell 50 is an adjustment nut 54, such also being referred to herein as adjustable stop means.

Formed in plate 46 is a port 56 which provides fluid communication between the interior of plate 46 and the exterior thereof in a manner which will be more fully explained hereinafter.

Similar ports 58, 60, 62 are formed in valve body 12 for the same purpose and will likewise be the subject of more detailed description hereinafter.

Turning now to FIG. 3, structure which has been identified in connection with the descriptions of FIGS. 1 and 2 retains the same numeral in FIG. 3. It should be noted that ports 56, 58, 60, 62 as shown in FIG. 3 are rotated 90° clockwise (as viewed in FIG. 2) in the view of FIG. 3. This reduces the number of drawings required and is for the purpose of illustration only.

Adjustment nut 54, best viewed in FIGS. 1 and 2, includes a hex-head upper portion and a cylindrical theaded lower portion 66 (in FIGS. 1 and 3), such being threadably engaged with threads 68 on the radially inner surface of the upper portion of spring shell 50. An axial bore 70 formed coaxially with nut 54 receives an upper portion 72 of a valve member 74.

Upper portion 72 is also received within a coaxial bore 76 formed in spring shell 50. Received over upper portion 72 is a biasing means or spring 78, such being disposed between a bearing 80 (which is also referred to herein as bearing means) at the upper end thereof and an upward facing annular shoulder 82 disposed about the circumference of valve member 74. Bearing 80 is disposed between the lower surface of adjustment nut 54 and the upper surface of spring 78. It can be seen that adjustment nut 54 may be screwed in and out thereby varying the extent to which spring 78 is compressed and accordingly varying the downward biasing action exerted by the spring on valve member 74.

A threaded radial bore 84 permits fluid communication between the interior of spring shell 50 and the exterior thereof. As previously described, spring shell 50 is mounted by bolts (like bolt 52).

Plate 46 is, in turn, secured to upper portion 14 of body 12 via bolts, one of which is bolt 48. Plate 46 includes therein a bore 88 which is coaxial therewith. A bore 90 is formed through the lowermost portion of spring shell 50 and is coaxial with bore 88. As can be seen, bore 90 is slightly less in diameter than bore 88 thus forming a downward facing annular shoulder 92 at the top of bore 88. Beneath shoulder 92 an upward facing annular shoulder 94 is defined about the circumference of valve member 74. Sealing means or o-rings 96, 98 are received in annular grooves about the circumference of the valve member as shown. O-rings 96, 98 sealingly engage between the valve member and bore 88. An annular cavity or groove 100 is defined on the radially inner surface of bore 88 about the circumference of the valve member. A radial bore 102 formed in plate 46 communicates at one end with groove 100 and at the other end with port 56.

A first bore 104, such also being referred to herein as a first bore portion, is coaxial with valve member 74 and communicates with the valve-member lower end or working face 105. A second bore 106, such being also referred to herein as a second bore portion, enables fluid communication with diametrically opposing sides of valve member 74 adjacent groove 100. Bores 104, 106 intersect and communicate with one another.

The lower part of plate 46 includes a radially outer annular portion 108, which is flushly abutted against the upper surface of portion 14 of the valve body, an annular middle portion 110, and a circular central portion 112. A downwardly directed counterbore 114 is formed in portion 112 and is coaxial therewith. Counterbore 114 communicates with bore 88 and the lower portion of valve member 74 is received therein. A pair of opposed radial bores 116, 118 are formed in central portion 112 and provide fluid communication between counterbore 114 and the radially outer surface of portion 112. Another pair of opposed radial bores (not visible in the view of FIG. 3) are found in central portion 112 ninety degrees from bores 116, 118.

A valve seat 120 is mounted on portion 112 via screws (one of which is screw 121 in FIGS. 4 and 5) which extend through seat 120 into portion 112 of plate 46. Seat 120 includes an upwardly facing seat surface 122 and a downwardly facing surface 124 on the opposite side of the seat. The seat may thus be easily removed and replaced to permit machining of surface 122 if necessary.

Valve member 74, the structure associated with plate 46 adjacent the valve member and valve seat 120 and its associated structure are collectively referred to herein as a pilot valve. The pilot valve operates generally as described in connection with U.S. Pat. No. 3,856,043 to Feild et al., such being submitted to the U.S. Patent and Trademark Office herewith and incorporated herein by reference. A generalized description of the operation of the pilot valve in conjunction with the operation of valve 10 is provided hereinafter.

The space between working face 105 and seat surface 122 is referred to herein as a transversely wedge-shaped annular space when the valve member is abutted against the seat surface. The annular space which is defined on its radially inner side by a cylinder which is coaxial with and of equal diameter to bore 88 and on its radially outer side by the radially inner surface of counterbore 114 is referred to herein as a fluid pressure chamber and as a pilot valve inlet. Also comprising the fluid pressure chamber are bores 116, 118 and the space between the lower surface of plate 46 and the upwardly directed surfaces of a slidable valve member or a piston 126. The upwardly-directed surfaces of piston 126 are referred to herein as the piston upper side or end or as the rear face of the piston.

Piston 126 is received in a radial bore 127, such being formed in middle portion 16 of valve body 12 and being coaxial therewith. Sealing means or o-rings 129, 131 are sealingly engaged between the outer surface of piston 126 and the radially inner surface of bore 127. O-ring 129 is referred to herein as a second o-ring.

Piston 126 includes a cavity or annular opening 128 formed therein which defines a portion of the fluid pressure chamber. A post 130 defines the radially inner side of the annular cavity. A spring 132, such being also referred to herein as biasing means, is disposed between a lower surface of valve seat 120 and an upper surface of piston 126 and is received over post 130. Spring 130 thus biases the piston downwardly.

An annular space 134 is defined by a groove formed on the radially outer surface of piston 126. A first bore 136 provides fluid communication between port 58 and space 134 and a second bore 138 provides fluid communication between space 134 and the fluid pressure chamber.

Port 58, bore 130, space 134 and bore 138 are referred to herein collectively as means for communicating pressurized fluid to the upper surface of the piston or to the fluid pressure chamber.

Piston 126 includes a working face 144, such being also referred to herein as a lower piston surface. Working face 144 opposes a seat surface or working face 146 which is formed on the upwardly-directed surface of a valve seat or annular member 148. Annular member 148 includes therein an axial orifice or bore 149 having an upper end in fluid communication with working face 146 and a lower end in fluid communication with the lower surface of annular member 148.

In the instant embodiment of the invention, working face 146 is substantially flat while working face 144 is at an angle thereto thus forming a transversely wedged-shaped annular space between the two working faces when piston 126 abuts against member 148. In the instant embodiment of the invention the angle is approximately three (3) degrees, thirty-eight (38) minutes. As used herein the term "taper" in reference to the relative positions of working faces 144, 146 might include curved working faces as well as flat faces with the "taper" or "wedge" aspect relating to an increase in the distance between the faces as the radially outer portions of the working faces are approached.

The relative positions of working faces 144, 146 are referred to herein as means for confining pressure drop to a location closely adjacent the orifice.

Annular member 148 is received within a substantially cylindrical cavity 150 formed in body 12. A pair of threaded inlet means or bores 152, 154 are coaxial with one another on opposite sides of middle portion 16 of valve body 12.

A threaded outlet bore 156 is coaxial with body 12 and with bore 149 and annular member 148. Bores 149, 156 are referred to herein collectively as outlet means.

The cross-sectional area of the annular space between the radially outer surface of member 148 and the radially inner surface of cavity 150 is equal to approximately one half of the cross-sectional area of each of inlet bores 152, 154.

Finishing now the description of the structure in FIG. 3, an annular flow restriction 158 is defined at its upper end by a break 160 in body 12. Flow restriction 158 is also defined between a radially outer surface 161 on member 148 and the radially inner surface of cavity 150. The restriction is annular in shape, and as will later be more fully explained comprises an entrance to a fluid flow path and is also referred to herein as an annular opening or space. Ideally the cross-sectional area of this space is preferably in the range of 50% to 200%, depending on the flow rate, of the minimum cross-sectional area of bore 149 for reasons for which will be more fully explained in connection with the description of the operation of valve 10 hereinafter.

Figure 4:
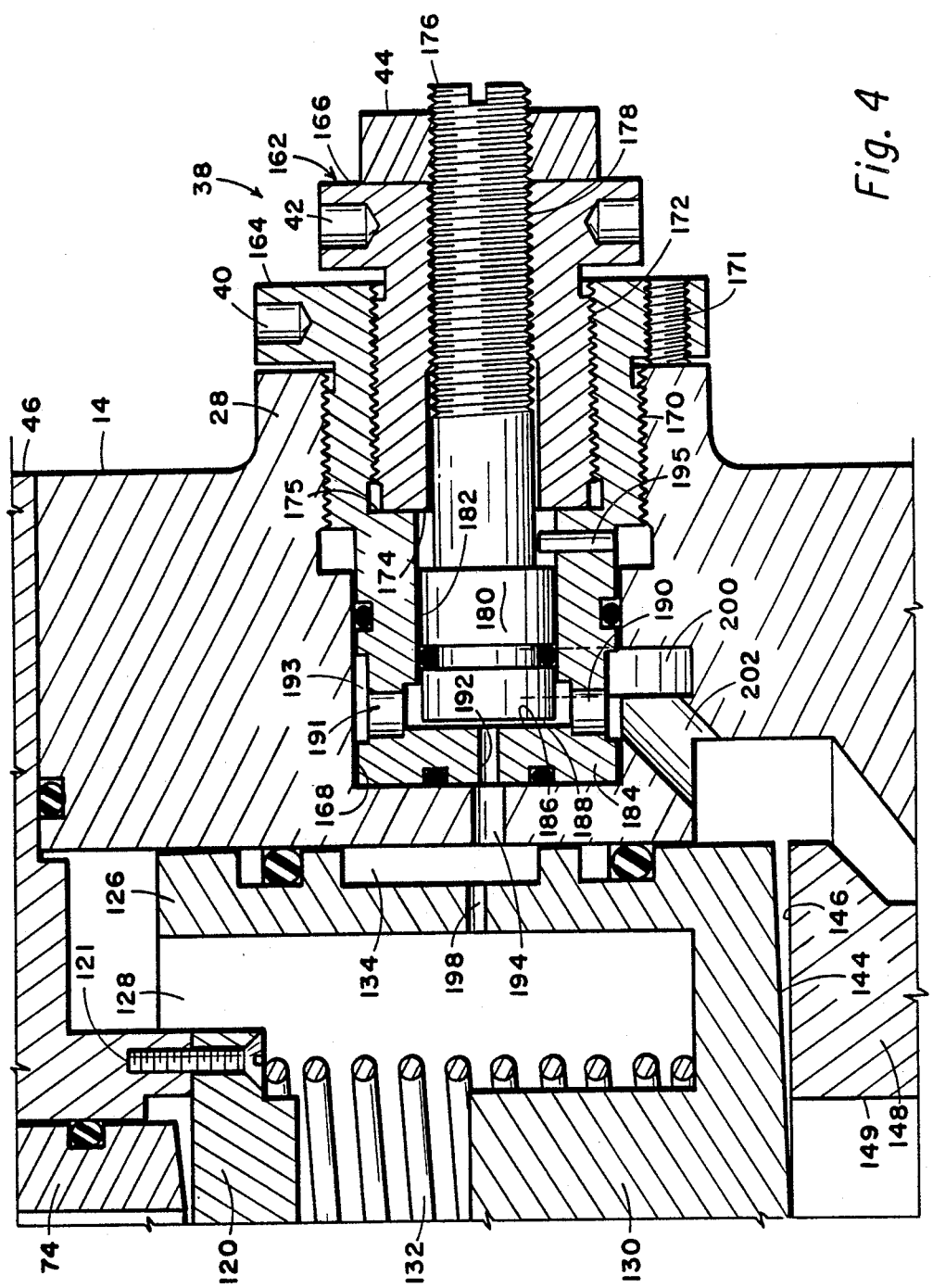
FIG. 4 is a view taken along line 4—4 in FIG. 2.

Structure which has been previously identified in FIGS. 1-3 retains the same numeral in FIG. 4. It should be noted that bores 40, 42 have been shifted into the plane of FIG. 4 from the view of FIG. 2 for the purposes of illustration only.

Consideration will now be given to the structure of cartridge valve assembly 38 in FIG. 4. Included therein is a cartridge valve body 162. The valve body includes a generally tubular outer element 164 and a generally tubular inner element (such being also referred to herein as a cylindrical element) or flush nut 166.

Element 164 is received in a bore 168 formed in upper portion 14 coaxial with stub 28. Element 164 includes a circular portion which extends to the right of stub 28 in FIG. 4 and which includes therein a plurality of radial bores, like bore 40, disposed on the radially outer surface thereof. These bores are used to receive prongs which extend from a wrench (not shown) for threadably engaging and disengaging element 164 with a threaded connection 170. One or more set screws, like set screw 171, are received through threaded bores in element 164 and abut against the radially outer surface of stub 28 to lock element 164 against rotation.

A second threaded connection 172 is formed between flush nut 166 and tubular element 164. The bores, like bore 42, on the radially outer surface of that portion of flush nut 166 which extends to the right of tubular element 164 accommodate a wrench (not shown) to enable rotating flush nut 166 to engage and disengage threaded connection 172. The leftmost surface 174 of flush nut 166 is firmly abutted against a shoulder 175 formed on the radially inner surface of element 164.

An elongate stem 176, such also being referred to herein as a second valve member, is coaxially engaged via threaded connection 178 with flush nut 166. As will later be more fully described, stem 176 is axially positionable relative to flush nut 166, under the action of threaded connection 178, when stem 176 is rotated. Lock nut 44 may then be tightened onto stem 176 until the same is engaged against the rightmost surface of flush nut 166 thereby locking stem 176 relative to the flush nut.

Stem 176 includes thereon a piston portion 180. Portion 180 is sealingly engaged with a coaxial bore 182 formed in tubular element 164. That portion of bore 182 to the left of the o-ring received about piston 180 is referred to herein as an internal cavity. A first valve member 184 makes up the leftmost end of tubular element 164 and includes thereon a substantially flat working face 186. Working face 186 is substantially parallel to a second working face 188 formed on the leftmost end of piston 180. A pair of opposed radial bores 190, 191 are formed between bore 182 and the radially outer surface of tubular element 164. Each of bores 190, 191 may be referred to herein as a first bore. Bores 190, 191 are opposite an annular groove 193 formed about the circumference of element 164.

A pin 195 is fixedly received in a radial bore formed through element 164. The pin extends into bore 182 as shown. As will later be described, pin 195 provides an important safety feature.

An axial bore 192, such being referred to herein as a second bore, is formed coaxially through first valve member 184 and communicates with a bore 194 formed in upper portion 14. Bore 194 provides communication between bore 192 and space 134. Piston 126 includes a bore 198 between annular opening 128, which comprises the fluid pressure chamber, and space 134.

A radial groove 200 is milled in upper portion 14 on one side of bore 168. Groove 200 enables fluid communication between flow restriction 158 (in FIG. 3), via bore 202, and the space between working faces 186, 188 via bores 190, 191.

Turning now to FIG. 6, plug 30, such being previously identified in FIGS. 1 and 2, is engaged in a bore 204 formed coaxially with stub 26 via threaded connection 206. Plug 30 has the rightmost end thereof seated against the end of bore 204. An o-ring 208 seals the central portion of the end of plug 30 from fluid communication with the outer end portion and sides of the plug. A bore 210 formed in upper portion 14 of the valve body communicates at one end with space 134 and has the other end thereof sealed against the central portion of the plug end. Thus, in the configuration shown in FIG. 6, there can be no flow through bore 210.

A pair of bores 212, 214 are formed in valve body 12. Bores 212, 214 are referred to herein as means for communicating fluid pressure from the outlet bore to the fluid pressure chamber. Bore 214 communicates at one end with outlet bore 156 and at its other end with the lower end of bore 212. The upper end of bore 212 communicates with a groove 216 which is milled in upper portion 14 of the valve body inside bore 204. Groove 216 thus communicates at one end with the upper end of bore 212 and at the other end with bore 204 in which plug 30 is received. O-ring 208 thus seals groove 216 and bore 210 from one another.

A second o-ring 218 seals between bore 204 and plug 30 around the circumference of the plug. A lock screw 220 is threadably engaged in a bore in the plug as shown thus locking plug 30 against rotation.

Turning now to FIGS. 7-11, consideration will be given to some of the different configurations in which valve 10 may operate and the manner of operation of each configuration.

In the relief/regulator mode, the valve is configured as shown in FIGS. 7 and 11.

In FIG. 7, ports 58, 60 are plugged as shown and a line 222 provides fluid communication between port 56 and port 62. When the valve is so configured, as will later be described, it operates in a relief/regulator mode by venting fluid via output bore 156 from a pipe connected to inlet bores 152, 154 in order to prevent fluid pressure in the line connected to bores 152, 154 from rising above a preselected level.

FIGS. 10 and 11 show the two configurations in which the valve may be placed by varying the positions of plug 30 and cartridge 38. In FIG. 10 cartridge 38 is received in bore 204 and plug 30 is received in bore 168. In FIG. 11 the positions of the cartridge and plug are reversed and are as shown for cartridge 38 in FIGS. 4 and 5 and for plug 30 in FIG. 6. In the relief/regulator mode, the valve is configured as shown in FIG. 11 (and FIG. 7).

In the relief/regulator mode, fluid pressure in inlet bores 152, 154 is maintained at a predetermined level and fluid is vented via outlet bore 156 to a tank (not shown) in varying amounts in order to so maintain the pressure. It should be appreciated that in the relief/regulator mode the valve can be connected at a terminal end of a pipe via one of inlet bores 152, 154 and the other may be plugged. Two inlet bores are provided for convenience to enable connections of additional valves or meters or the like.

With reference also to FIGS. 3 and 4, initially piston 126 is in the position shown in FIG. 3, i.e., spring 132 biases the piston against the surface 146.

As fluid enters the annular space defined between the radially inner surface of cavity 150 and the radially outer surface of annular member 148, under power of, e.g., a pump, the fluid divides substantially evenly around the annular member.

Because of the relatively small cross-sectional area of annular flow restrictor 158 relative to the flow rate therethrough, the fluid is substantially evenly distributed about valve seat 148 in annular space 158. A flow rate and/or restriction cross-sectional area which will so distribute the fluid can be easily determined by a person having ordinary skill in the art. As previously noted, the cross-sectional area of restrictor 158 is preferably in the range of 50% to 200% of the minimum cross-sectional area of bore 149. For a given size of cross-sectional area for restriction 158, an appropriate flow rate may be determined by adjusting the rate until the fluid is so distributed. After the fluid flows through restriction 158, it enters the space between working faces 144, 146. Restriction 158 thus prevents pressurized fluid from approaching piston 126 from a single side thereby urging the piston sideways and causing increased wear and preventing appropriate piston movement. The fluid flows radially from the outer circumference of the working faces toward orifice 149. As the flow increases, piston 126 is urged upwardly against the biasing force of spring 132. When the upward pressure of the fluid beneath piston 126 equals the downward biasing force of spring 132, upward piston movement stops while flow between the working faces and into orifice 149 continues.

Referring now to FIG. 4, it can be seen that fluid in flow restrictor 158 also flows into bore 202, groove 200, space 193 and bores 190, 191 into the space between working faces 186, 188 of cartridge valve 38.

From the space between the working faces fluid flows into bores 192, 194, space 134 and bore 198 into annular opening 128 which is in communication with the entire upper surface of piston 126.

Because plug 30 is received in bore 204 as shown in FIG. 6, no flow occurs in bores 214, 212, 210.

When the fluid pressure chamber above piston 126 is filled with fluid, pressure in the chamber begins to rise. Such fluid pressure is communicated via bores 116, 118 to the working face 105 on the lower end of valve member 74. When the pressure on working face 105 is sufficient to overcome the downward biasing force of spring 78 on valve member 74, the valve member moves upwardly and fluid is vented via bores 104, 106, 102, port 56 and into line 222 which in turn vents the fluid via port 62 to outlet bore 156 which, as will be recalled, is the flow path for fluid vented through valve 10 in order to prevent the pressure on inlet bores 152, 154 from rising above a preselected level.

It can be seen that the downward biasing force of spring 78 determines the maximum pressure which can appear from the fluid chamber above piston 126. This downward force is adjustable by compressing and decompressing the spring via nut 54. For a given position of nut 54 the pressure in the fluid pressure chamber will not rise above a pressure level determined by the spring force.

It can be seen that as pressure in the fluid pressure chamber begins to rise, piston 126 begins to move downwardly as a result thereof. When valve member 74 begins to vent fluid from the fluid pressure chamber, the pressure rises no further, because it cannot, and downward piston motion stops. The regulator is now operating in a steady state condition with the pressure on the upper side of the piston being slightly less than the pressure on the downward-facing side of the piston. This is so because there is less pressure on face 144 above orifice 149 (which may be at atmospheric pressure) thereby providing only an annular area on the lower side of the piston against which full fluid pressure can be exerted whereas the entire upper surface of the piston is exposed to pressure in the fluid pressure chamber.

It should be noted that the speed at which valve 10 goes from initial fluid flow to steady state operation may be varied by adjusting cartridge valve assembly 38. In order to, e.g., increase the flow rate through cartridge valve assembly 38, it is changed from the configuration shown in FIG. 4 to that shown in FIG. 5. Such change may be achieved in one of several ways.

Firstly, assuming no fluid flow through through valve 10, lock screw 171 is loosened and the previously-referred to wrench (not shown) may be engaged with the bores, like bore 40, about the circumference of tubular element 164. The wrench is used to unthread threaded connection 170 thereby removing tubular element 164 and the structure carried thereon (namely flush nut 166, stem 176 and lock nut 44) from bore 168. Thereafter lock nut 44 is loosened from the position shown in FIG. 4 to enable axial rotation of stem 176 via threaded connection 178. Alternatively, it may be desirable to loosen lock nut 44 prior to removing tubular element 164 from bore 168. In any event, once stem 176 may be moved along threaded connection 178, a thickness gauge may be inserted between working faces 186, 188 via bore 190 or bore 191. Stem 176 may be turned in a direction which moves working face 188 toward working face 186 until the thickness gauge is touching both faces. Thereafter lock nut 44 is tightened to fix stem 176 relative to tubular element 162.

At higher flows through cartridge valve assembly 38, valve 10 achieves steady state operation more quickly than at lower flows. However, higher flows through valve assembly 38 use more pressurized fluid thereby expending more energy. It is therefore desirable to use lower flow rates unless the particular application requires that the valve rapidly arrive at steady state operation requiring use of higher flow rates through valve assembly 38.

It is to be appreciated that cartridge valve assembly 38 may be calibrated to correlate a given axial position of stem 176 relative to flush nut 162 with a given cross-sectional flow area between the working faces. The minimum cross-sectional flow area in valve assembly 38 is equal to the surface area of a cylinder having the diameter of bore 192 and a height equal to the distance between working faces 186, 188.

After cartridge valve assembly 38 is so adjusted, the same can be reinserted into bore 168 by making threaded connection 170 until the leftmost end of tubular element 164 is flushly abutted against the bottom of bore 168.

If during operation of the valve it is desirable to flush the space between or around working faces 186, 188 to remove any scale, dirt or the like which may have accumulated, the previously-referred to wrench may be inserted in the bores, like bore 42, in flush nut 166 and the same may be unthreaded from threaded connection 172. This withdraws stem 176 relative to tubular element 164 thus separating the working faces of the cartridge valve and permitting a temporarily increased flow therebetween. Such flow flushes any grit, scale or the like from between and around the working faces.

Figure 5:
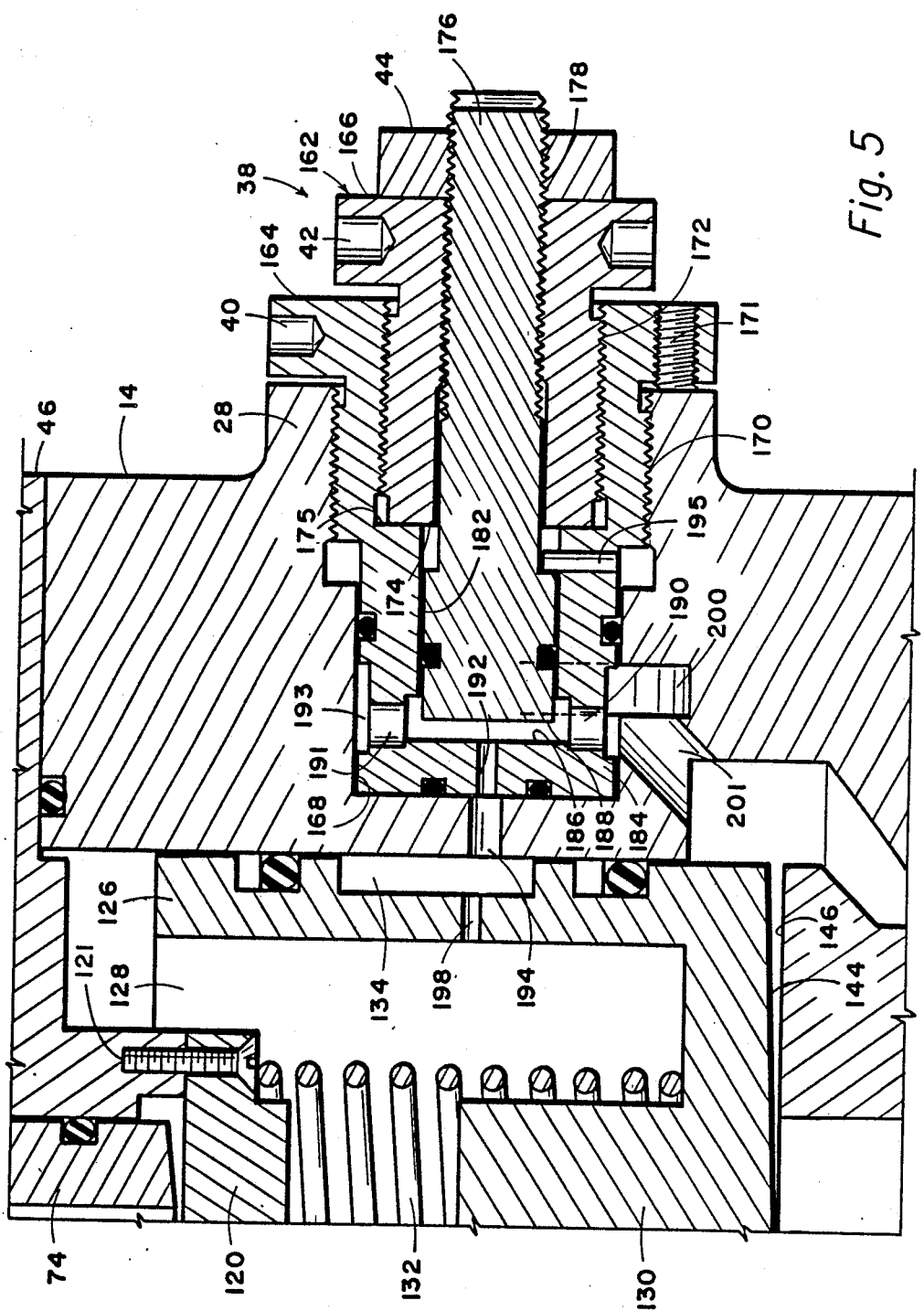
FIG. 5 is a view similar to FIG. 4 with the structure shown in a slightly different configuration from that of FIG. 4.

After the valve is so flushed, flush nut 166 is axially rotated thereby returning the same to the position shown in FIG. 4, i.e., surface 174 is flushly abutted against shoulder 175 as shown in FIGS. 4 and 5. When this position is resumed, the previously-calibrated spacing between working faces 186, 188 is restored.

In a situation in which the calibration of cartridge valve assembly 38 is not critical, the same may be adjusted without removing tubular portion 164 and may even be adjusted during flow through the valve. Such is achieved by loosening lock nut 44 and using the slot on the end of stem 176 to vary the axial position of the stem relative to flush nut 166 until the desired flow through the cartridge valve assembly is achieved. Flow through valve assembly 38 may be monitored by measuring the flow from port 56.

Pin 195 prevents removal of stem 176 either by unthreading the same from the flush nut or by unthreading flush nut 166 from threaded connection 172. In either case, the rear of piston 180 strikes the pin and prevents further withdrawl. This serves as a safety feature to prevent leakage, which might occur in the form of an extremely high pressure fluid stream when the valve is regulating high pressures, during adjustment of cartridge valve assembly 38 while fluid is flowing in valve 10.

Returning again to consideration of the overall operation of valve 10, it will be recalled that when in the relief/regulator mode, valve 10 prevents fluid pressure in inlet bores 152, 154 (and in any pipes connected thereto) from rising above a predetermined level. When valve 10 is so operating in steady state condition, fluid is continuously vented via valve member 74 and port 56 in order to prevent the pressure in the fluid pressure chamber above piston 126 from rising above the preselected level determined by the downward biasing force exerted by spring 78.

The maximum flow achieveable through bore 192 in cartridge valve assembly 38 is less than that achieveable through bores 104, 106 of valve member 74. Thus, even under the highest possible flow rates and pressures, pressure in the fluid pressure chamber does not rise above that determined by spring 78. If greater flow were achieveable through cartridge valve assembly 38 than through the pilot valve, the possibility exists that pressure in the pressure chamber could rise above the pressure beneath piston 126 thus slamming the same shut.

It can be seen that in steady state operation, there is no pressure differential across o-ring 129 because both sides of o-ring 129 are exposed to the pressure in the fluid pressure chamber. O-ring 129 serves to center piston 126 to prevent metal-to-metal contact.

There is only a slight pressure drop across o-ring 131. In tests conducted with a valve constructed as shown in FIG. 3, when the pressure in inlet bores 152, 154 was 350 psi, pressure on the top of the piston was 323 psi. With adjustment nut 54 set to regulate inlet pressure at 3000 psi, the pressure on the top of the piston was 2838 psi thus putting only 162 psi differential across o-ring 131. The pressure on the top of the piston is typically 4% to 8% less than that beneath the piston for all operating pressures.

In the event of a sudden pressure surge, e.g., in the fluid provided to inlet bore 152, piston 126 is forced upwardly thereby compressing the fluid in the fluid pressure chamber above the piston and forcing valve member 74 upwardly. Upward movement of member 74 vents fluid from the pressure chamber and prevents an increase in the pressure thereof. Such pressure relief in the pressure chamber occurs before the increase in fluid pressure is communicated to the pressure chamber via cartridge valve assembly 38. This exceptionally fast response to pressure changes is a result of the inlet of the pilot valve, which includes member 74, being received in the fluid pressure chamber and of the operating characteristics of the pilot valve.

It should be appreciated that in steady state operation the valve can vary the flow through orifice 149 in order to prevent the pressure in inlet 152 from rising above the level preselected by spring 78 with relatively small movements of piston 126. In fact, o-rings 129, 131, after the valve is in steady state operating condition, typically do not wipe the radially inner surface of the bore in which they are received but merely flex as piston 126 moves slightly upwardly and downwardly in order to maintain pressure. This is a result of the cross-sectional flow area between working faces 144, 146 being substantially variable by relatively small movements of piston 126. The minimum cross-sectional area between faces 144, 146 is determined by calculating the radially outer surface area of a cylinder having a diameter equal to bore 149 at its intersection with working face 146 and a height equal to the distance between working faces 144, 146 at the intersection of bore 149 with working face 146. Relatively small movements of piston 126 significantly change the cross-sectional flow area thereby enabling a wide range of pressure regulation with relatively small piston movements.

Valve 10 may typically be used on a line having other valves or fluidic components thereon which, in operation, divert flow from valve 10. As flow is diverted, it can be seen that the total flow between working faces 144, 146 decreases thereby permitting piston 126 to move downwardly. Such downward movement reduces the flow through orifice 149 thereby maintaining pressure in inlet bore 152 at the preselected value. As flow through other devices continues to divert flow away from valve 10, working face 144 approaches working face 146.

The relief/regulator valve of the invention provides a very flat flow versus pressure curve. In other words, the regulator prevents pressure from rising above a preselected level at the inlet bores for a very wide range of flows through orifice 149 from the very highest down to the very lowest flows thus producing a substantially square flow versus pressure curve for the valve.

Under certain conditions of flow rate and compression of spring 78, piston 126, best viewed in FIG. 4, will be positioned substantially upwardly from its lowermost position (which is shown in FIG. 4) thus providing a substantial gap between working faces 144, 146. Under other such conditions, piston 126 operates in steady state condition only slightly above annular member 148 with working faces 144, 146 being relatively close to one another.

When piston 126 is operating so that faces 144, 146 are relatively close to one another, the degree of taper between the working faces is critical. If the taper, for substantially flat faces as in the instant embodiment of the invention, is less than about two (2) degrees, twenty (20) minutes, the pressure between working faces 144, 146 may drop to the point where the pressure above piston 126 causes the piston to slam shut, i.e., piston 126 abuts against annular member 148 thus preventing pressure regulation as described above.

The pressure on the radially inner peripheries of working faces 144, 146 may approach atmospheric pressure, e.g., when the pressure in bore 149 which is vented to a tank, while the pressure on the radially outer peripheries of working faces 144, 146 is at the regulated pressure determined by the compression setting for spring 78. The valve can regulate pressures as high as 5,000 p.s.i. and higher, thus producing a substantial pressure drop between the radially outer and inner peripheries of working faces 144, 146.

In the case of, e.g., substantially parallel working faces, this pressure drop tends to be evenly distributed between bore 149 and the radially outer peripheries of working faces 144, 146 as the working faces approach one another. When such occurs, the pressure beneath piston 126 is substantially lowered, thus causing the pressure on top of the piston to slam the same shut as described above.

In order to maintain the pressure drop which occurs between the radially outer peripheries of working faces 144, 146 and the radially inner peripheries thereof closely adjacent the radially inner peripheries (i.e., adjacent bore 149), the working faces must be further apart at the radially outer peripheries thereof than at the radially inner peripheries. In the case of substantially flat working faces as in the instant embodiment of the invention, it has been discovered that sufficient spacing between the faces occurs if the working faces assume an angle of at least approximately two (2) degrees, twenty (20) minutes to one another.

When the pressure drop occurs adjacent bore 149 rather than at the outer peripheries of the working faces, the lower pressure appears beneath a smaller area at piston 126, i.e., that adjacent bore 149, thereby creating less downward force than if the pressure drop was evenly distributed between the radially outer peripheries of the working faces and the radially inner peripheries thereof. It is to be appreciated that the degree of angle, at least in the lower ranges of taper in accordance with the invention, i.e., above approximately two (2) degrees, twenty (20) minutes, affects the distribution of the pressure drop beneath the piston. Thus, changing the taper angle changes the downward force on piston 126 for a given relative position of working faces 144, 146.

Alternatively, if the taper is too large, e.g., on the order of approximately 25° or larger, the valve begins acting as a needle valve thus causing turbulent flow and the resultant noise and wear of working faces 144, 146 adjacent the intersection of orifice 149 with working face 146. Thus, the ideal angle of taper between working faces 144, 146 is between about two degrees, twenty-minutes and about twenty five degrees.

Consideration will now be given to the operation of valve 10 in a reducing valve configuration, as shown in FIGS. 8 and 11.

In FIG. 8, ports 58, 60, 62 are plugged as is inlet bore 154. Port 56 is connected via a line 224 to a fluid tank 226. A pipe carrying fluid is connected to inlet bore 152 with the fluid exiting the valve via a pipe connected to outlet bore 156.

In FIG. 11, plug 30 and cartridge valve assembly 38 are positioned as shown in FIGS. 4–6.

When configured as shown in FIGS. 8 and 11, the valve is inserted in a flow line with input flow applied to inlet bore 152 and output flow flowing from outlet bore 156. In this configuration the valve reduces the pressure appearing at inlet 152 to a lower pressure on outlet 156. In this configuration, the internal components of valve 10 function essentially as described in connection with the relief/regulator configuration of FIGS. 7 and 11.

As fluid enters inlet 152 initially, piston 126 is urged upwardly until the pressure in the fluid pressure chamber above the piston begins rising at which point piston 126 begins to lower until the upward and downward pressures on the piston are equalized. Valve 10 then begins steady state pressure-reducing operation. It can be seen that if the pressure at inlet bore 152 tries to increase, the pressure increase is communicated to working face 144 on the piston which urges the same upwardly thereby increasing flow through orifice 149 and preventing the pressure at inlet bore 152 from rising. As in the case with the relief/regulator mode, pressure increases in the fluid pressure chamber above piston 126 which are a result either of upward piston movement or of pressure communicated to the piston chamber via cartridge valve 38 are limited by valve member 74 which vents fluid via line 224 to tank 226. The configuration of FIGS. 8 and 11 thus provides a pressure reducing valve which prevents pressure at the inlet thereof from rising above a preselected level.

Another pressure reducing valve configuration is shown in FIGS. 8 and 10. In order to change from the previously just described configuration of FIG. 8 and 11, valve assembly 38 is switched with plug 30 to produce the configuration of FIG. 10.

As in the case of the description in connection with the configuration of FIGS. 8 and 11, valve 10 is a pressure reducing valve in a pipeline having a flow entrance at inlet 152 and a flow outlet at outlet 156. It can be seen by examining FIG. 10 that fluid pressure from outlet 156 is communicated via bores 214, 212 and cartridge valve 38, now received in bore 204 (in FIG. 6), to the fluid pressure chamber above the piston. As has been previously described herein, depending upon the adjustment of valve assembly 38, the fluid pressure chamber fills with fluid after flow through the valve begins, the fill time depending upon the adjustment of the cartridge valve. When flow first begins, piston 126 is urged upwardly until the fluid pressure chamber fills thereby causing pressure in the chamber to increase. The pressure increase begins movement of piston 126 downwardly until the forces exerted on both sides of the piston are balanced and steady state operation begins.

In this configuration, valve 10 reduces pressure responsive to the downstream pressure which is applied to the top of piston 126.

Turning now to the configuration shown in FIG. 9, ports 60, 62 are plugged and port 56 is again connected via line 224 to tank 226. An external source of pressurized fluid 228 is connected via a line 230 and a flow restricting valve 232 to port 58. In the instant embodiment of the invention valve 232 is constructed in accordance with the flow restricting valve shown in FIGS. 14–16 and described hereinafter. In this configuration, the valve may be operated as a pressure reducing valve or in a relief/regulator mode.

When configured as in FIG. 9, a remote source of pressurized fluid 228 is utilized to control pressure in the fluid pressure chamber on top of piston 126 rather than sampling the pressures appearing at the inlet or outlet bores of the valve. When so used, two plugs, like plug 30, are screwed into bores 168, 204. The device of FIG. 9 may be used either as a relief/regulator or as a pressure reducing valve in a flow line with flow input to the valve appearing at inlet bore 152 and flow output at bore 156.

The configuration of FIG. 9 operates as described in connection with the previously described relief/regulator and pressure reducing modes except that the pressure sensed above piston 126 is determined by the pressure of pressurized fluid 228 rather than by the inlet or outlet pressures. When so configured, valve member 74 may be set to open at some pressure slightly above that of pressurized fluid 228 thereby providing a backup safety pressure relief.

Turning now to FIGS. 12–16, consideration will given to a second embodiment of the invention. Indicated generally at 234 is a valve constructed in accordance with the instant invention. Structure which has been previously identified in connection with the embodiment of FIGS. 1 and 2 bears the same numeral in FIGS. 12 and 13. Generally speaking, the only difference in valve 10 and valve 234 is that valve 234 includes an external valve assembly, indicated generally at 236, which may be connected via lines, as hereinafter described, with ports 56, 58, 60, 62 to cooperate with the remainder of valve 234 in the same manner that cartridge valve assembly 38 cooperates with the remainder of valve 10.

Valve 234 also includes a cap 238 which is removably mounted on the top of spring shell 50 for covering and protecting adjustment nut 54 as shown.

Figures 14, 15, 16:
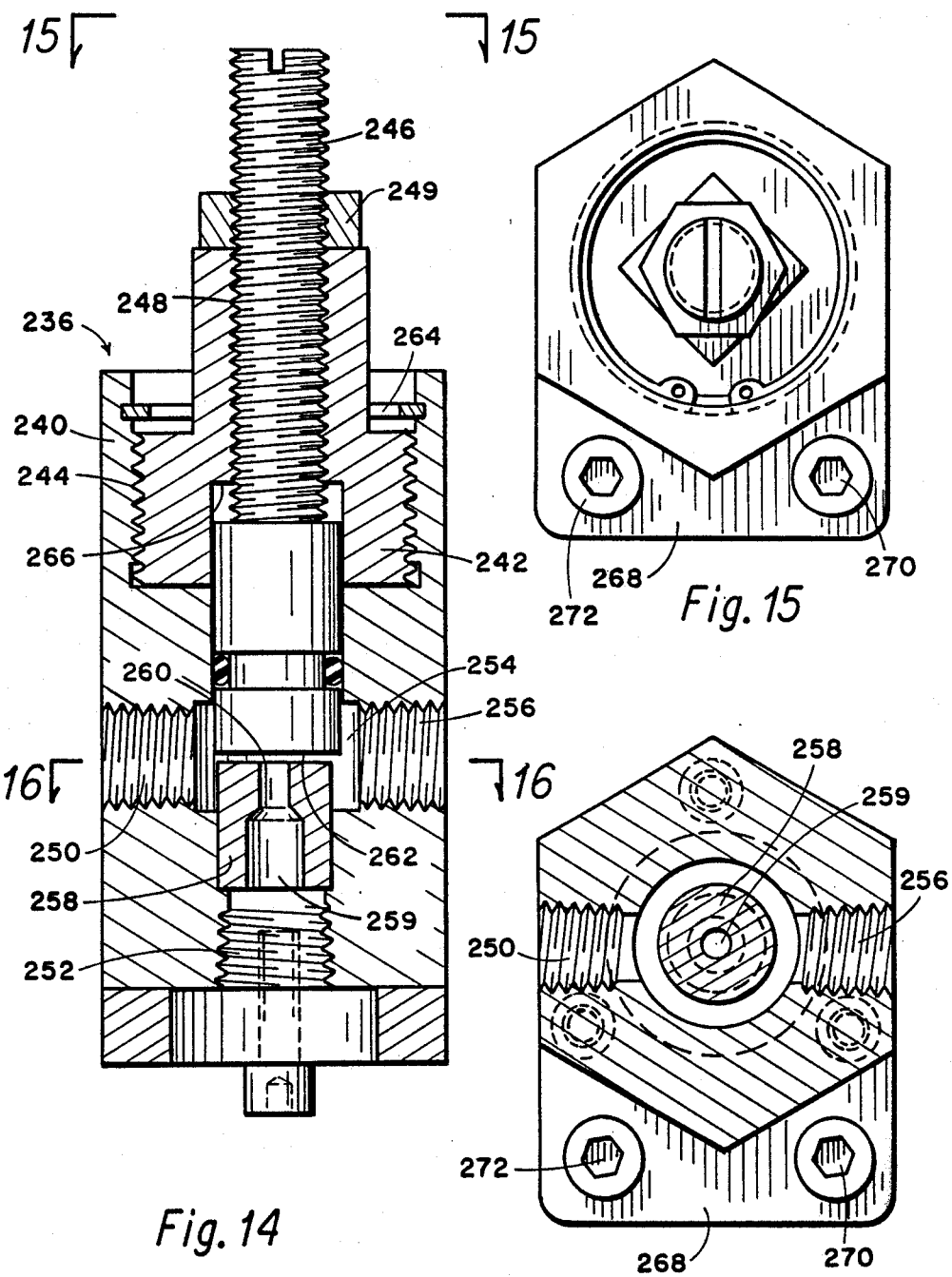
FIG. 14 is a view taken along line 14—14 in FIG. 12.
FIG. 15 is a view taken along line 15—15 in FIG. 14.
FIG. 16 is a view taken along line 16—16 in FIG. 14.

Valve assembly 236 includes therein a valve body 240 having a substantially cylindrical element or flush nut 242 threadedly connected thereto via a connection 244 (in FIG. 14). An elongate stem 246, such also being referred to herein as a second valve member, is threadably engaged via connection 248 with the flush nut. A lock nut 249 locks stem 246 relative to flush nut 242 as shown in FIG. 14.

Valve body 240 includes therein an inlet bore 250 such being referred to herein as a first bore, and an outlet bore 252, such being referred to herein as a second bore. Each bore intersects an internal cavity 254 formed in the valve body. Another bore 256 may be plugged during operation of valve 236 or may be used to flush valve 236 when fluid flows therethrough. Cavity 254 includes therein a substantially cylindrical valve member 258 having a working face 260 formed thereon. Stem 246 is substantially the same as valve stem 176 in FIG. 4 and also includes a working face 262 at the lower end thereof. A retainer ring 264 is received in a groove formed on a radially inner surface of valve body 240 to prevent removal of flush nut 242 when fluid is flowing through the valve assembly. A downward facing shoulder 266 likewise prevents unthreading of stem 246 from the flush nut while the valve assembly is operating.

Valve assembly 236 is mounted on a plate 268 which in turn is mounted on plate 46 via bolts 270, 272.

In operation, lines (not shown) may be connected to ports 250, 252 in valve assembly 236 in order to interconnect the same with the remainder of valve 234. When, for example, it is desired to configure the valve as a relief/regulator, port 56 is connected by a line to port 62, port 60 is connected to bore 250 in valve assembly 236 and bore 252 on the valve assembly is connected to port 58. It can thus be seen that fluid flow occurs from inlet bore 152 into flow restriction 158, from thence to port 60, into valve assembly 236 via bore 250, out of the valve assembly via bore 252 and back to the valve body via port 58. The operation is thus the same as that described in connection with the FIGS. 7 and 11 relief/regulator.

With port 62 plugged and port 56 drained to a tank, as shown in FIG. 8, and with valve assembly 236 connected between ports 56, 60 as described above, the valve is in configuration for connection as a pressure reducing valve with pressure being applied from inlet bore 152 to the fluid pressure chamber above piston 126. Valve 234 thus operates in the same manner as described in connection with the FIG. 8 and 11 operation of valve 10.

Alternatively, valve 234 may be configured as a pressure reducing valve with the downstream pressure applied to the upper surface of piston 126 in the same fashion as described in connection with the FIGS. 8 and 10 embodiment of valve 10. This is accomplished by again draining port 56 to a tank and by plugging port 60. A line is connected from port 62 to bore 250 of valve assembly 236 and another line is connected from bore 252 of the valve assembly to port 58 thereby applying pressure appearing at outlet bore 156, via valve assembly 236, to the fluid pressure chamber above piston 126.

Finally, an external source of pressure, as described in connection with the embodiment of FIG. 9, may be connected to port 58. With port 56 connected to port 62 (or to a tank) and port 60 plugged, the valve may be used as a relief/regulator. Valve 234 may be used as a pressure reducing valve with port 56 supplied to the tank, port 60 plugged (or connected to a pressure gauge) and port 62 plugged.

When so configured, valve 234 may be operated as a relief/regulator or pressure reducing valve as described in connection with the FIG. 9 configuration of valve 10.

Figure 17:
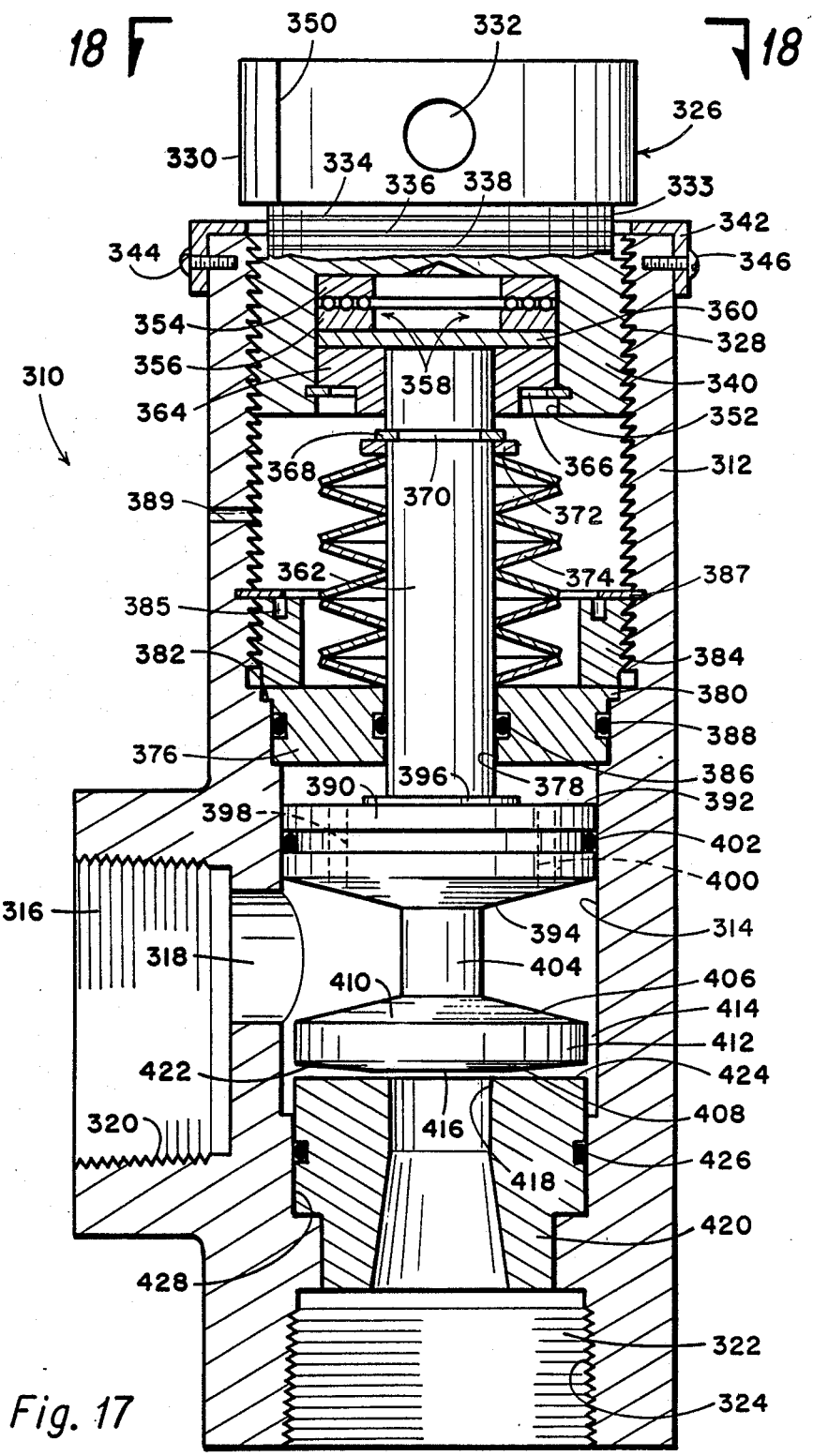
FIG. 17 is a cross-sectional view of a third valve constructed in accordance with the instant invention.
Figure 18:
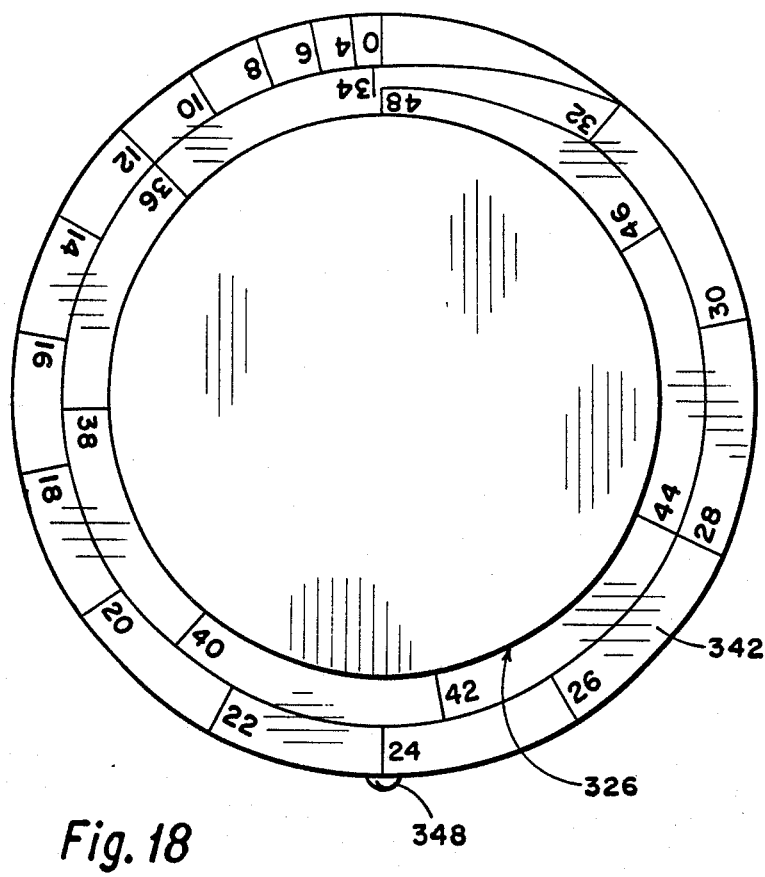
FIG. 18 is view taken along line 18—18 in FIG. 17.
Figure 19:
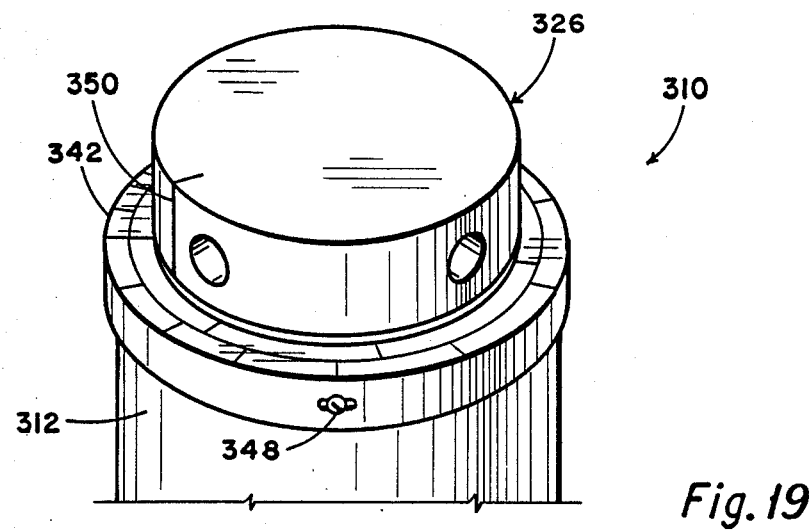
FIG. 19 is a perspective view of the upper portion of the valve shown in FIG. 17.

Turning now to FIGS. 17-19, consideration will be given to a third embodiment of the invention. Indicated generally at 310 in FIG. 17 is a flow control valve constructed in accordance with the instant invention. Valve 310 includes a tubular housing 312 having a bore 314 formed therein. Housing 312 includes inlet means or inlet 316, such communicating with the interior of bore 314 via bore 318. Inlet 316 includes a set of radially inner threads 320 for interconnecting the same to a pipe (not shown) for providing fluid from the pipe into bore 314.

Housing 312 further includes an outlet bore 322 which also includes a radially inner set of threads 324 for connecting outlet bore 322 to another pipe (also not shown) for transmitting fluid from the interior of bore 314 away from the valve.

Generally speaking, valve 310 is used as a flow control valve in a pipeline having flow into inlet 316, through bore 314 and out bore 322. As will later become apparent herein, valve 310 may be adjusted to variably restrict the flow of fluid in the pipeline.

An adjustment nut 326 is threadably engaged with housing 312 at the upper end of bore 314 via a buttress threaded connection 328. The adjustment nut is also referred to herein as a shaft moving means and as a cylindrical element. Nut 326 includes a substantially cylindrical upper portion 330 having a bore 332 which extends laterally therethrough. A second bore (viewable in FIG. 19) extends through upper portion 330 substantially normal to bore 332. A bar or rod (not shown) may be inserted into or through bore 332 (or the other bore) in order to facilitate turning nut 326.

Nut 326 further includes an intermediate cylindrical portion 333 having a set of three parallel lines 334, 336, 338 scribed about the circumference thereof thereby defining circles coaxial with cylindrical portion 333.

A lower cylindrical portion 340 includes a set of radially outer threads which interconnect with threads on the radially inner surface of the upper portion of bore 314 to form threaded connection 328.

An annular scale ring 342 is mounted on the upper surface of housing 312 via screws 344, 346 (in FIG. 17) and screw 348 (in FIGS. 18 and 19). Slots as shown in ring 342 permit adjustment of the radial position of the scale ring. As can best be viewed in FIG. 18, ring 342 includes numerals and lines printed thereon which, as will later be more fully described, provide an indication of the adjustment of valve 310.

Upper cylindrical portion 330 of adjustment nut 326 includes a line 350 scribed thereon which is used in conjunction with reading scale 342.

Lower cylindrical portion 340 includes a downward-facing axial bore 352. A pair of opposed annular bearing raceways 354, 356 are received in the upper portion of bore 352 and a thrust bearing, indicated generally at 358, is received therebetween. Raceways 354, 356 and bearings 358 are referred to herein collectively as bearing means. A substantially planar disk 360 is interposed between the lower surface of raceway 356 and the upper surface of a substantially cylindrical shaft 362.

An annular shaft guide 364 is received over the upper end of shaft 362. A retaining ring 366 is positioned against a lower surface of shaft guide 364 thereby maintaining the shaft guide, disk 360, raceways 354, 356 and bearing 358 in position as shown. Retaining ring 366 is received in an annular groove formed on the radially inner surface of bore 352.

A retaining ring 368 is received in a groove 370 formed on the radially outer surface of shaft 362. Abutted against the underneath side of ring 368 is a washer 372. Biasing means or spring 374 is compressed between washer 372 and a disk 376. In the instant embodiment of the invention a plurality of commercially available spring washers comprise spring 374; however, a commercially available coil spring would work equally well.

Disk 376 includes a central bore 378 through which shaft 362 is received. A circular lip 380 includes a downward facing annular surface which rests on an upward facing annular shoulder 382 formed in bore 314. A threaded collar 384 is engaged with the buttress threads found on the radially inner surface of bore 314 as shown. The collar is abutted against disk 376 for maintaining the same in place. Bores, like bore 385 are provided to enable a wrench (not shown) to engage collar 384 for threadably engaging and disengaging the collar with bore 318. A retaining ring 387 is received in a groove formed on the radially inner surface of bore 314 immediately above collar 384 thereby securing the same in position. O-rings 386, 388 seal between the radially outer surface of disk 376 and the radially inner surface of bore 314 and between the radially inner surface of central bore 378 and the radially outer surface of shaft 362, respectively. Disk 376 and o-rings 386, 388 are referred to herein collectively as sealing means.

A bore 389 is provided as a vent in housing 312 in the event of leakage through o-rings 386, 388.

A guide means or piston 390 is formed integrally with shaft 362 and includes a substantially flat upper surface 392 and a tapered lower surface 394. An annular raised portion 396 is formed integrally with shaft 362 and piston 390. When shaft 362 moves upwardly, portion 396 abuts against the lowermost surface of disk 376 thereby maintaining fluid communication between surfaces 394, 392 via bores 398, 400. An o-ring 402 is in sealing engagement between the radially outer surface of piston 390 and the radially inner surface of bore 314. O-ring 402 serves as a guide for maintaining piston 390 and its associated structure substantially coaxial with housing 312. The radially outer surface of piston 390 which is closely adjacent the radially inner surface of bore 314 is referred to herein as a cylindrical portion of piston 390.

A shaft 404, such being coaxial with shaft 362, connects the lower portion of piston 390 with the upper portion of a valve member 406. Shaft 404 is formed integrally with piston 390 and valve member 406. Valve member 406 includes a first lower side, such having a circular working face 408 formed thereon, and a second upper side 410 which includes a tapered portion as shown. A cylindrical portion 412 of valve member 406 defines an annular space 414 between the radially outer surface of cylindrical portion 412 and the radially inner surface of bore 314.

Working face 408 includes a substantially flat circular portion 416 centered thereon. As can be seen, the diameter of circular portion 416 is slightly greater than that of an outlet orifice 418 which is formed in a valve member 420 (which is referred to herein as a first valve member) beneath circular portion 416. A tapered portion 422 is defined between circular portion 416 and the radially outer edge of valve member 406. Valve member 420 includes an upwardly directed substantially flat working face 424. Working face 424 and circular portion 416 are substantially parallel to one another. In the instant embodiment of the invention, the angle formed between tapered portion 422 and working face 424 is approximately four (4) degrees, thirty-four (34) minutes.

It should be appreciated that the instant invention works equally well if tapered portion 422 is formed on valve member 420 and the lower end of valve member 406 is substantially flat thus providing a tapered opening between the valve members about the circumference thereof when the same are abutted against one another.

When shaft 362 is urged downwardly, in a manner which will be hereinafter described, valve member 406 abuts against valve member 420 and working faces 408, 424 define therebetween a transversely substantially wedge-shaped space.

As described in connection with the embodiments of FIGS. 1–17, the taper angle must be sufficient so that most of the pressure drop beneath valve member 406 occurs adjacent bore 418. Otherwise (i.e., if the pressure drop is evenly distributed between the working faces) the valve may slam shut.

Outlet bore 322 and outlet orifice 418 are referred to herein collectively as outlet means. An o-ring 426 seals between the radially outer surface of valve member 420, which is pressed into a counterbore 428 in housing 312 as shown, to seal between the radially inner surface of the counterbore and the radially outer surface of the annular valve member.

In operation, inlet 316 is connected to a pipe (not shown) which provides a flow of fluid into bore 314 via bore 318. Another pipe (also not shown) is connected to outlet bore 322 to provide a fluid flow path from bore 314.

After fluid enters bore 314 via bore 318, it flows upwardly via bores 398, 400 to the space between upper surface 392 of piston 390 and the lower surface of disk 376. Fluid also flows to the space between working faces 408, 424 via annular space 414. Even at high pressures and flow rates, annular space 414 substantially evenly distributes the fluid around the outer peripheries of working faces 408, 424 thereby preventing lateral loading of valve member 406 and the structure associated therewith.

Fluid flows between the working faces from the radially outer peripheries thereof toward orifice 418, into the orifice and into outlet bore 322.

The degree to which valve 310 restricts the flow of fluid passing therethrough can be changed by adjusting nut 326. If it is desired to decrease restriction of fluid flow, nut 326 is unscrewed from threaded connection 328 thereby enabling upward movement of shaft 362. Since spring 374 biases the shaft upwardly, as nut 326 moves upwardly the spring moves the shaft also upwardly while maintaining contact between the upper surface of shaft 362 and disk 360. As the shaft raises, the space between working faces 408, 424 increases thereby increasing flow through the valve.

Alternatively, nut 326 may be screwed downwardly in threaded connection 328 by turning nut 326 in the opposite direction. Such urges the working faces toward one another thereby decreasing fluid flow through the valve. Raceway 354 turns with nut 326 while raceway 356 remains stationary. It can thus be seen that shaft 362 does not rotate as it is raised and lowered responsive to turning nut 326.

When valve member 406 is operating so that faces 408, 424 are relatively close to one another, the degree of taper between the working faces is critical. If the taper, for substantially flat faces as in the instant embodiment of the invention, is less than about two (2) degrees, twenty (20) minutes, the pressure between working faces 408, 424 may drop to the point where the pressure above piston 406 causes the piston to slam shut, i.e., piston 406 abuts against working face 424 thus preventing flow through orifice 418.

Pressure on the radially inner peripheries of working faces 408, 424 may approach atmospheric pressure, i.e., the pressure in orifice 418, while the pressure on the radially outer peripheries of working faces 408, 424 is at the pressure of the fluid provided to inlet 316. This fluid pressure may be as high as 5,000 p.s.i. and higher, thus producing a substantial pressure drop between the radially outer and inner peripheries of working faces 408, 424.

In the case of, e.g., substantially parallel working faces, this pressure drop tends to be evenly distributed between orifice 418 and the radially outer peripheries of working faces 408, 424 as face 408 approaches face 424. When such occurs, the pressure beneath valve member 406 is substantially lower than that above it, thus causing the pressure on top of the piston to slam the same shut as described above.

In order to maintain the pressure drop which occurs between the radially outer peripheries of working faces 408, 424 and the radially inner peripheries thereof closely adjacent the radially inner peripheries (i.e., adjacent orifice 418), the working faces must be further apart at the radially outer peripheries thereof than at the radially inner peripheries. In the case of substantially flat working faces as in the instant embodiment of the invention, it has been discovered that sufficient spacing between the faces occurs when the working faces assume an angle of at least approximately two (2) degrees, twenty (20) minutes to one another.

When the pressure drop occurs adjacent orifice 418 rather than at the outer peripheries of the working faces, the lowered pressure appears beneath a smaller area of valve member 406, i.e., that adjacent orifice 418, thereby creating less downward force than if the pressure drop was evenly distributed between the radially outer peripheries of the working faces and the radially inner peripheries thereof. It is to be appreciated that the degree of angle, at least in the lower ranges of taper in accordance with the invention, e.g., between approximately two (2) degrees, twenty (20) minutes and approximately twenty-five (25) degrees, affects the distribution of the pressure drop beneath the piston. Thus, changing the taper angle changes the downward force on valve member 406 for a given relative position of working faces 408, 424.

The sizes of valve member 406 and its associated structure are selected so as to substantially balance the fluid pressure forces acting on piston 390, valve member 406 and the shafts associated with each. For example, when the valve is in operative condition, :.e., filled with fluid flowing therethrough, fluid pressure acts upwardly on that portion of working face 408 which is over working face 424. Likewise, fluid pressure acts downwardly on tapered surface 410. Fluid pressure acts upwardly on tapered lowered surface 394 and, through bores 398, 400, acts downwardly on upper surface 392. Each of the foregoing surfaces as well as the sizes of shaft 404, 362 and orifice 418 are selected so that the upward and downward forces acting on valve member 406 are substantially equal when fluid is in the valve.

Spring 374 is non-linear and creates a smaller upward force on shaft 362 and the structure associated therewith when the spring is extended than when the spring is compressed. Thus, when working faces 408, 424 approach one another, and the pressure begins to drop beneath valve member 406 as described above, the upward force in spring 372 is greater since the spring is more compressed. The valve therefore tends to operate in a substantially balanced condition.

A person having ordinary skill in the art can select appropriate piston and shaft and spring tension to balance the upward and downward faces acting on valve member 406 and its associated structure thereby providing a valve which is easily adjustable even at very high pressures and flow rates. If the valve is to be used in a system which includes high downstream pressure, the same will act on circular portion 416. This can be taken into account in selecting piston and shaft sizes and tension on spring 374 substantially balance the upward and downward faces acting on valve member 406 thereby allowing easy valve adjustement even in the presence of high downstream pressure.

Spring 374 prevents hysteresis which might be introduced by slack in threaded connection 328 by maintaining upward pressure on shaft 362 and nut 326 at all times.

Scale ring 342 is calibrated so that line 350 indicates an equivalent orifice diameter on the scale ring. The equivalent orifice diameter is calculated by determining the minimum cross sectional flow area through valve 310 and then converting the same to a diameter of a round orifice which has the same cross sectional area.

The minimum cross sectional area through which flow occurs in valve 310 is defined by the raidally outer surface of a cylinder having a diameter equal to orifice 418 and a height equal to the distance between central portion 416 and working face 424. The radially outer surface area of such a cylinder is the minimum cross sectional flow area through which fluid in the valve flows. Relatively small rotational movement of nut 326 significantly changes the cross-sectional flow area thereby enabling a wide range of flow control with relatively small movements of shaft 362.

The numbers appearing on scale ring 342 are diameters of circular areas, in sixty-fourths of an inch, which are equal to the above-described minimum cross sectional flow area in valve 310 when line 350 is aligned with a selected number on scale 342. When line 334 only is visible above scale 342 in the view of FIG. 17, line 350 is used to read off the radially outermost scale on ring 342, i.e., the scale from 0-34. When lines 334, 336 are both visible, the scale is read by aligning line 350 with a number on the scale from 34-48 and when all of lines 334, 336, 338 are visible, the valve is wide open.

Figure 20:
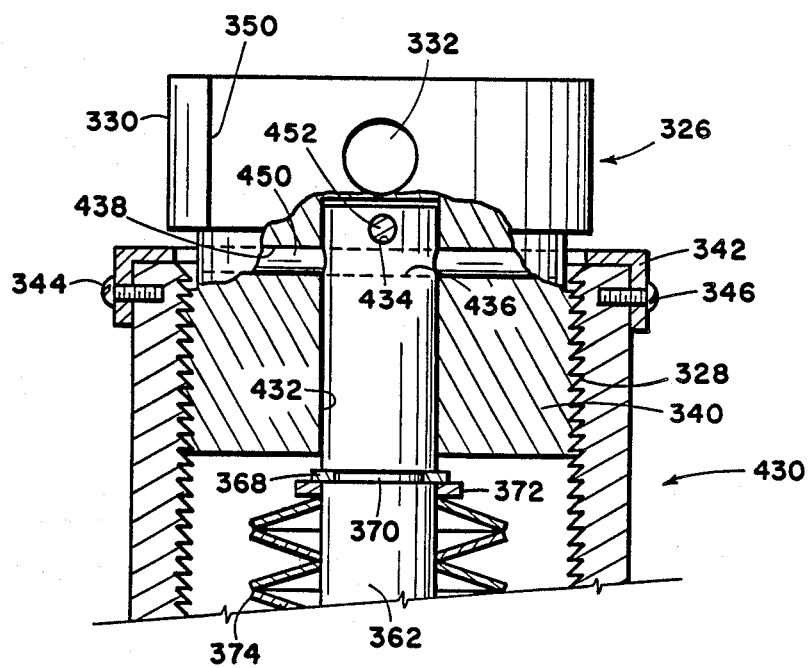
FIG. 20 is a partial cross-sectional view of a fourth valve constructed in accordance with the instant invention.

Turning now to FIG. 20, indicated generally at 430 is a fourth valve constructed in accordance with the instant invention. The structure which has been previously identified in FIG. 17-19 retains the same numeral in FIG. 20. Shaft 362 is received in an axial bore 432 formed in lower cylindrical portion 340. A pair of bores, 434, 436 are formed transversely to one another through the upper end of shaft 362 as shown. A pair of corresponding bores, one of which is bore 438, are formed transversely through cylindrical portion 340 so that when shaft 362 is received within bore 432, bore 436 is coaxially aligned with bore 438 and bore 434 is likewise coaxially aligned with an associated bore (not visible) formed through cylindrical portion 340.

A pin 450 is received through bores 436, 438 and a pin 452 is received through bore 434 and the corresponding bore (not visible) formed through cylindrical portion 340.

The pin and bore arrangement as described thus prevents rotational as well as axial movement of shaft 362 relative to cylindrical portion 340.

The operation of the embodiment of the invention shown in FIG. 20 is essentially the same as that for FIGS. 17-19. However, in the embodiment of FIG. 20, shaft 362 is prevented from downward movement in the event of a decrease in pressure beneath valve member 406 thus maintaining valve member 106 in the position selected by rotation of cylindrical portion 340.

It is to be appreciated that additions and modifications may be made to the instant embodiment of the invention without departing from the spirit thereof which is defined in the following claims.

What is claimed is:

1. In a valve assembly of the type having a housing; means in the housing for defining a valve capable of being opened and closed, said valve having a pair of valve members, one of which is moveable, each of the valve members having a working face; said housing having inlet means for permitting a flow of fluid thereinto and to a location adjacent to the outer periphery of the working faces; one of the valve members having an orifice extending thereinto from its working face, the working faces being engagable with each other to close the valve, the orifice being closed when the valve is closed; and means coupled with the housing for permitting a flow of fluid out of said orifice, wherein the improvement comprises means disposed between said inlet means and the outer peripheries of said working faces for restricting the flow of fluid therebetween said restricting means defining an annular opening disposed about the outer peripheries of said working faces and being defined by the outer surface of one of said valve members and by an inner surface of said housing, said annular opening having a cross-sectional area of less than approximately 200% of the cross-sectional area of said orifice.

2. The valve assembly of claim 1 wherein the cross-sectional area of said annular opening is greater than approximately 50% of the cross-sectional area of said orifice.

3. A valve assembly comprising:
a housing;
a first valve member mounted on said housing and having a working face formed thereon;
a bore formed in said housing, said bore being in communication with said first valve member working face;
a second valve member slidably received in said bore and having a first side directed toward said first valve member working face and a second side opposite thereto, said first side having a working face formed thereon;
inlet means formed in said housing for permitting a flow of fluid to a location adjacent the outer peripheries of the working face;
one of said valve members having an orifice extending therein from its working face, said faces being engagable with each other near the orifice to prevent fluid flow through the orifice;
outlet means coupled with said housing for permitting a flow of fluid out of said orifice; and
means disposed between said inlet means and the outer peripheries of said working face for restricting the flow of fluid therebetween, said restricting means comprising an annular space formed between one of said valve members and said housing and having a cross-sectional area of less than approximately 200% of the cross-sectional area of said orifice.

4. The valve assembly of claim 3 wherein the cross-sectional area of said annular opening is greater than approximately 50% of the cross-sectional area of said orifice.

5. A fluid valve assembly comprising:
a housing;
a first valve member mounted on said housing, said first valve member having a working face;
a second valve member received in said housing for movement toward and away from said first valve member, said second valve member having a working face on one side thereof directed toward said first valve member and a rear face on the other side thereof;
a centrally located orifice extending into one of said valve members from the working face thereof;
inlet means formed in said housing for permitting a flow of fluid to a location adjacent the outer peripheries of said working faces;
means for communicating pressure on said second valve member working face to said rear face; and
a taper formed on at least one of said valve faces, said working faces forming an angle to one another of a size sufficient to substantially eliminate all pressure decrease between the outer peripheries of said working faces as said valve members approach one another when fluid is flowing therethrough.

6. The fluid valve asembly of claim 5 wherein said angle is between about two degrees, twenty minutes and about twenty-five degrees.

7. A method for making a valve assembly comprising the steps of:
providing a housing;
forming a first valve member having a working face thereon;
mounting said first valve member on said housing;
forming a second valve member having a working face thereon;
creating a cavity in said housing for receiving the second valve member therein;
forming a working face on the second valve member for defining a variable orifice between said faces when said second valve member is received in said housing cavity;
forming an inlet in said housing for permitting a flow of fluid to a location adjacent the outer peripheries of said working faces;
forming a centrally located bore extending into one of said valve members from the working face thereof;
providing means for communicating pressure on said second valve member working face to the other side of said second valve member when said valve member is received in said housing cavity; and
creating a taper on at least one of said valve faces, said taper having an angle sufficient to substantially eliminate all pressure decrease between the outer peripheries of said working faces as said valve members approach one another when fluid is flowing therethrough.

8. The method of claim 3 wherein the step of creating a taper on at least one of said valve faces comprises the step of creating a taper having an angle between about two degrees, twenty minutes and about twenty-five degrees.

9. A fluid valve assembly comprising:
a housing;
a first valve member mounted on said housing, said first valve member having a working face;
a second valve member received in said housing for movement toward and away from said first valve member, said second valve member having a working face on one side thereof directed toward said first valve member and a rear face on the other side thereof;
a centrally located orifice extending into one of said valve members from the working face thereof;
inlet means formed in said housing for permitting a flow of fluid to a location adjacent the outer peripheries of said working faces;

mean for communicating pressure on said second valve member working face to said rear face; and means for conforming substantially all pressure drop to a location closely adjacent said orifice for substantially all spaced-apart positions of said working faces when said valve is in operative condition, said confining means comprising a tapered configuration formed on the working face of at least one of said valve members to define therebetween a transversely substantially wedge-shaped annular space when the valve members abut one another.

10. The fluid valve assembly of claim 9 wherein said working faces are at an angle of between two degrees, twenty minutes and about twenty-five degrees.

11. A fluid valve assembly comprising:
a housing;
a first valve member mounted on said housing having a working face formed thereon;
a bore formed in said housing, said bore being in communication with said first valve working face;
a second valve member received in said bore for sliding movement along a fixed axis between a first position in which said valve members abut one another and a second position in which said valve members are spaced apart, said second valve member having a first side directed toward said first valve member working face and a second side opposite thereto, said first side having a working face formed thereon;

inlet means formed in said housing for permitting a flow of fluid to a location adjacent the outer peripheries of said working face;

one of said valve members having an orifice extending thereinto from its working face, said faces being engagable with each other near the orifice to prevent fluid flow through the orifice;

outlet means coupled with said housing for permitting a flow of fluid out of said orifice; and means disposed between said inlet means and the outer peripheries of said working faces for restricting the flow of fluid therebetween, said restricting means comprising an annular space formed between one of said valve members and said housing for all operating positions of said second valve member.

* * * * *

UNITED STATES PATENT AND TRADEMARK OFFICE
CERTIFICATE OF CORRECTION

PATENT NO. : 4,895,342

DATED : January 23, 1990

INVENTOR(S) : Eugene P. Feild

It is certified that error appears in the above-identified patent and that said Letters Patent is hereby corrected as shown below:

Column 4, line 5: Change "bore88." to --bore 88.--

Column 21, line 44: Change "therein" to --thereinto--

Column 22, line 49: Change "3" to --7--

Column 23, line 3: Change "conforming" to --confining--

Column 23, line 13: Change "between two" to --between about two--

Signed and Sealed this

Twenty-third Day of March, 1993

Attest:

STEPHEN G. KUNIN

Attesting Officer

Acting Commissioner of Patents and Trademarks